United States Patent
Matsuda (10) Patent No.: US 11,901,764 B2
(45) Date of Patent: Feb. 13, 2024

(54) POWER SUPPLY CIRCUIT AND ELECTRONIC DEVICE

(71) Applicant: Seiko Epson Corporation, Tokyo (JP)

(72) Inventor: Kinya Matsuda, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/680,603

(22) Filed: Feb. 25, 2022

(65) Prior Publication Data

US 2022/0278547 A1    Sep. 1, 2022

(30) Foreign Application Priority Data

Feb. 26, 2021  (JP) ................................ 2021-029709

(51) Int. Cl.
*H02J 9/06* (2006.01)
*H02J 7/00* (2006.01)

(52) U.S. Cl.
CPC .............. *H02J 9/061* (2013.01); *H02J 7/007* (2013.01)

(58) Field of Classification Search
CPC .. H02J 50/10; H02J 50/12; H02J 50/80; H02J 9/00; H02J 7/00
See application file for complete search history.

(56) References Cited

U.S. PATENT DOCUMENTS

| | | | |
|---|---|---|---|
| 8,026,694 B2* | 9/2011 | Kamijo | H02J 7/0044 320/108 |
| 9,356,450 B2* | 5/2016 | Jeon | H02J 9/061 |
| 10,756,581 B2* | 8/2020 | Onishi | H02J 7/04 |
| 10,879,737 B2* | 12/2020 | Onishi | H01H 47/002 |
| 2018/0123395 A1* | 5/2018 | Onishi | H02J 50/80 |
| 2018/0254666 A1* | 9/2018 | Onishi | H02J 50/90 |
| 2019/0030344 A1* | 1/2019 | He | A61N 1/378 |

FOREIGN PATENT DOCUMENTS

JP    2006-149132 A    6/2006

* cited by examiner

*Primary Examiner* — Rexford N Barnie
*Assistant Examiner* — Joseph N Inge
(74) *Attorney, Agent, or Firm* — Harness, Dickey & Pierce, P.L.C.

(57) ABSTRACT

A power supply circuit includes a charge system circuit and a discharge system circuit. The charge system circuit charges a battery based on power received by a power receiving unit. The discharge system circuit supplies power to a power supply target device based on a battery voltage from the battery. The discharge system circuit includes a power supply circuit and a power-off setting circuit. The power supply circuit supplies power to the power supply target device based on the battery voltage. The power-off setting circuit sets the power supply circuit to a power-off state when it is detected that a non-input state of the battery voltage to the discharge system circuit is changed to an input state of the battery voltage to the discharge system circuit, and releases the power-off state after the power receiving unit starts receiving power.

12 Claims, 10 Drawing Sheets

POWER SUPPLY CIRCUIT AND ELECTRONIC DEVICE

The present application is based on, and claims priority from JP Application Serial Number 2021-029709, filed Feb. 26, 2021, the disclosure of which is hereby incorporated by reference herein in its entirety.

BACKGROUND

1. Technical Field

The present disclosure relates to a power supply circuit, an electronic device, and the like.

2. Related Art

JP-A-2006-149132 discloses a momentary interruption recovery circuit in a portable terminal device in which a battery can be attached and detached. When a battery voltage is no longer supplied, the momentary interruption recovery circuit outputs a power-on command signal to an external power supply control circuit when it is determined that the time is within a recoverable time, and does not output a power-on permission signal to the power supply control circuit when it is determined that the time is out of the recoverable time. Accordingly, the power supply control circuit automatically recovers a circuit power supply when the battery voltage is momentarily interrupted, and the power supply control circuit maintains the circuit power supply off when the battery voltage is not momentarily interrupted.

When a battery is coupled for the first time, if the power supply based on the battery voltage is not determined to be off, there is a problem that the power supply may be unintentionally turned on and the battery may be consumed. Since the momentary interruption recovery circuit in JP-A-2006-149132 detects the interruption of the battery voltage after the battery is coupled to the portable terminal device, the operation is not an operation when the battery is coupled for the first time. That is, the momentary interruption recovery circuit in JP-A-2006-149132 cannot determine whether the power supply control circuit turns off the circuit power supply when the battery is coupled for the first time.

SUMMARY

An aspect of the present disclosure relates to a power supply circuit including: a charge system circuit that charges a battery based on power received by a power receiving unit; and a discharge system circuit that supplies power to a power supply target device based on a battery voltage from the battery, in which the discharge system circuit includes a power supply circuit that supplies power to the power supply target device based on the battery voltage, and a power-off setting circuit that sets the power supply circuit to a power-off state when it is detected that a non-input state of the battery voltage to the discharge system circuit is changed to an input state of the battery voltage to the discharge system circuit, and that releases the power-off state after the power receiving unit starts receiving power.

Another aspect of the present disclosure relates to an electronic device including: a power supply target device, and a power supply circuit that charges a battery based on power received from a charger and that supplies power based on a battery voltage from the battery to the power supply target device, in which the power supply circuit turns off the supply of the power when the battery is coupled to the power supply circuit, and turns on the supply of the power when the electronic device is placed at the charger in a power transmittable state.

DESCRIPTION OF EXEMPLARY EMBODIMENTS

Hereinafter, a preferred embodiment of the present disclosure will be described in detail. The present embodiment to be described below does not unduly limit contents described in the claims, and all configurations described in the present embodiment are not necessarily essential constituent elements.

1. Power Transmission System

Figure 1:
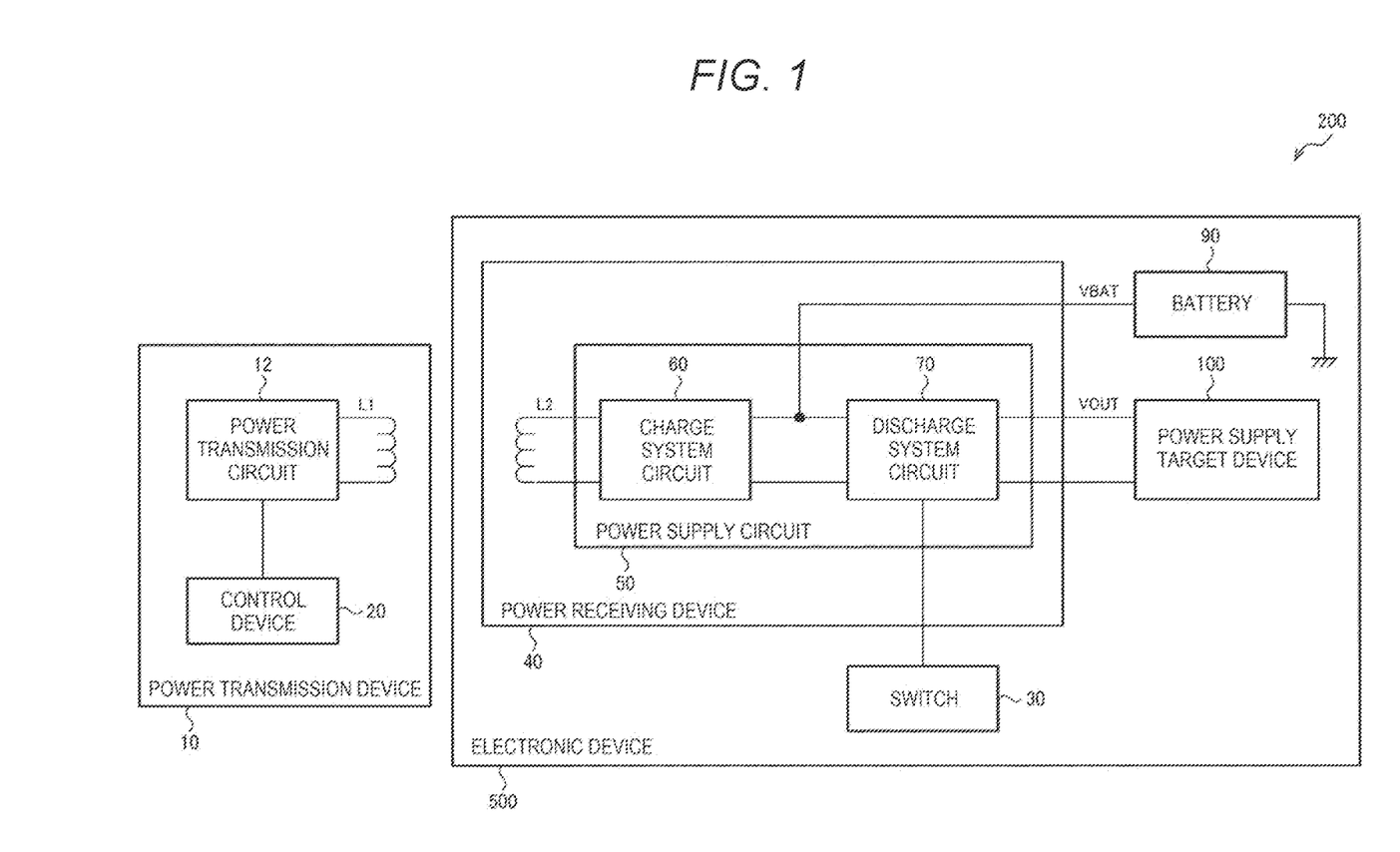
FIG. 1 is a configuration example of a power transmission system.

FIG. 1 is a configuration example of a power transmission system 200. The power transmission system 200 includes a power transmission device 10 and an electronic device 500 on a power receiving side. Although an example will be described below in which the power transmission system 200 is a contactless power transmission system, the power transmission system 200 may be a contact-type power transmission system. In this case, a power transmission terminal and a power reception terminal are provided instead of a primary coil L1 and a secondary coil L2.

The power transmission device 10 is a charger that supplies power for the electronic device 500 to charge a battery 90. The electronic device 500 on the power receiving side is, for example, a hearing aid, a smartphone, a smart watch, a head-mounted display, a mobile phone, a shaver, an electric toothbrush, or an electric vehicle.

The power transmission device 10 includes the primary coil L1, a power transmission circuit 12, and a control device 20. The power transmission device 10 is also referred to as a primary side device or a primary side module. The control device 20 is, for example, an integrated circuit device.

The power transmission circuit 12 generates an AC voltage of a predetermined frequency during power transmission and supplies the AC voltage to the primary coil L1. When the power transmission circuit 12 supplies the AC voltage to the primary coil L1, power is transmitted from the primary coil L1 to the secondary coil L2. The primary coil L1 is electromagnetically coupled to the secondary coil L2 to form a power transmission transformer. For example, when power transmission is necessary, the electronic device 500 on the power receiving side is placed on the power transmission device 10 which is a charger to attain a state in which a magnetic flux of the primary coil L1 passes through the secondary coil L2. This state is referred to as a landing state. On the other hand, when power transmission is unnecessary, the power transmission device 10 and the electronic device 500 are physically separated from each other to attain a state in which the magnetic flux of the primary coil L1 does not pass through the secondary coil L2. This state is referred to as a removed state.

The control device 20 executes various controls on a power transmission side. For example, the control device controls power transmission performed by the power transmission circuit 12 and controls communication processing between the power transmission device 10 and the electronic device 500.

The electronic device 500 includes a power receiving device 40, the battery 90, and a power supply target device 100. The electronic device 500 may include a switch 30 that turns on or off the electronic device 500.

The battery 90 is a chargeable secondary battery, and is, for example, a lithium battery or a nickel battery. The lithium battery is a lithium ion secondary battery, a lithium ion polymer secondary battery, or the like. The nickel battery is a nickel-hydrogen storage battery, a nickel-cadmium storage battery, or the like. A battery voltage VBAT is a terminal voltage of the battery 90.

The power supply target device 100 is a device to which power is supplied from the power supply circuit 50 based on the battery voltage VBAT. The power supply target device 100 is, for example, a processor that controls a system of the electronic device 500. The processor is, for example, a DSP, a microprocessor, a microcontroller, or a CPU.

The power receiving device 40 includes the secondary coil L2 and the power supply circuit 50. The power receiving device 40 is also referred to as a secondary-side device or a secondary-side module. The power supply circuit 50 is also referred to as a control device on a power receiving side, and the power supply circuit 50 is, for example, an integrated circuit device.

The power supply circuit 50 executes various controls on the power receiving side. The power supply circuit 50 includes a charge system circuit 60 and a discharge system circuit 70.

The charge system circuit 60 receives power transmitted by the power transmission device 10, and operates with the received power. The charge system circuit 60 charges the battery 90 based on the power received from the power transmission device 10.

The discharge system circuit 70 is a circuit that operates with power supplied from the battery 90. The discharge system circuit 70 regulates the battery voltage VBAT to generate an output voltage VOUT, and outputs the output voltage VOUT to the power supply target device 100 to supply power to the power supply target device 100.

2. Detailed Configuration Example of Power Supply Circuit

Figure 2:
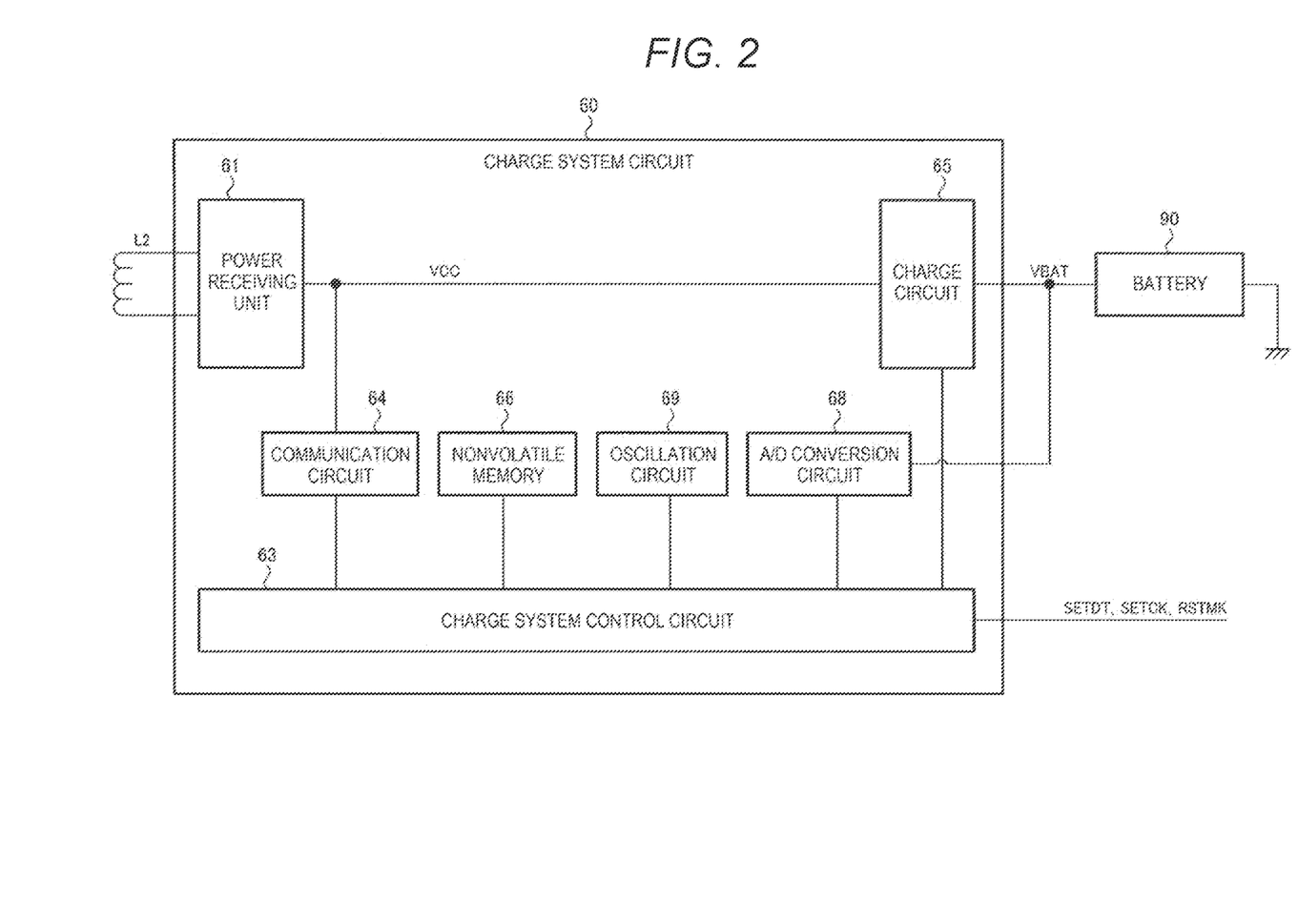
FIG. 2 is a detailed configuration example of a charge system circuit.

Hereinafter, a detailed configuration example of the power supply circuit 50 will be described. First, a detailed configuration example of the charging system circuit 60 is shown in FIG. 2. The charge system circuit 60 includes a power receiving unit 61, a charge system control circuit 63, a communication circuit 64, a charge circuit 65, a nonvolatile memory 66, an A/D conversion circuit 68, and an oscillation circuit 69.

The power receiving unit 61 receives the power transmitted by the power transmission device 10. When the power transmission system 200 is a contactless power transmission system, the power receiving unit 61 is also referred to as a power receiving circuit. The power receiving unit 61 is specifically a rectifier circuit, and converts an AC voltage induced in the secondary coil L2 into a DC rectified voltage VCC. When the power transmission system 200 is a contact-type power transmission system, the power receiving unit 61 is, for example, a power receiving terminal. In this case, by coupling a power transmission terminal of the power transmission device 10 and the power receiving terminal of the power receiving unit 61, an input voltage is input to the power receiving terminal, and the input voltage is input to the charge circuit 65.

The charge system control circuit 63 controls units of the charge system control circuit 63, and executes various types of control processing executed during charging of the battery 90. The charge system control circuit 63 controls communication between the power transmission device 10 and the charge system circuit 60. The charge system control circuit 63 is, for example, a logic circuit generated according to an automatic arrangement and wiring method such as a gate array, or various processors such as a DSP.

The oscillation circuit 69 generates a clock signal by oscillation and outputs the clock signal to the charge system control circuit 63. The charge system control circuit 63 executes control processing using the clock signal from the oscillation circuit 69.

The communication circuit 64 performs load modulation for transmitting communication data to the power transmission device 10. The communication circuit 64 transmits communication data to the power transmission device 10 by modulating a current load of a node having the rectified voltage VCC based on a control signal from the charge system control circuit 63.

The charge circuit 65 charges the battery 90 based on the power received by the power receiving unit 61. The charge circuit 65 controls the charging. Specifically, the charge circuit 65 charges the battery 90 by generating a constant current from the rectified voltage VCC and supplying the constant current to the terminals of the battery 90.

The A/D conversion circuit 68 measures the battery voltage VBAT by A/D converting the battery voltage VBAT. The A/D conversion circuit 68 outputs a measurement result to the charge system control circuit 63.

The charge system control circuit 63 executes control based on the measurement result. For example, when the battery voltage VBAT becomes higher than a given voltage, the charge system control circuit 63 outputs signals SETDT and SETCK, which are shutdown release signals, to the discharge system circuit 70 to release a shutdown state of the discharge system circuit 70. At this time, the charge system control circuit 63 outputs a mask signal RSTMK to the discharge system circuit 70. In the present disclosure, a state in which power supply from the discharge system circuit 70 to the power supply target device 100 is turned off is referred to as a power-off state. A state in which not only the power supply is turned off but also the entire discharge system circuit 70 does not operate is referred to as the shutdown state.

The nonvolatile memory 66 stores various types of information such as status information of the power receiving device 40. The charge system control circuit 63 operates based on information stored in the nonvolatile memory 66, or causes the nonvolatile memory 66 to store status information and the like. The nonvolatile memory 66 is, for example, a nonvolatile semiconductor memory such as an EEPROM.

Next, the discharge system circuit 70 will be described. A detailed configuration example of the discharge system circuit 70 according to the present embodiment will be described with reference to FIG. 5. Before this description, problems that occur when the present embodiment is not used will be described with reference to FIGS. 3 and 4.

Figure 3:
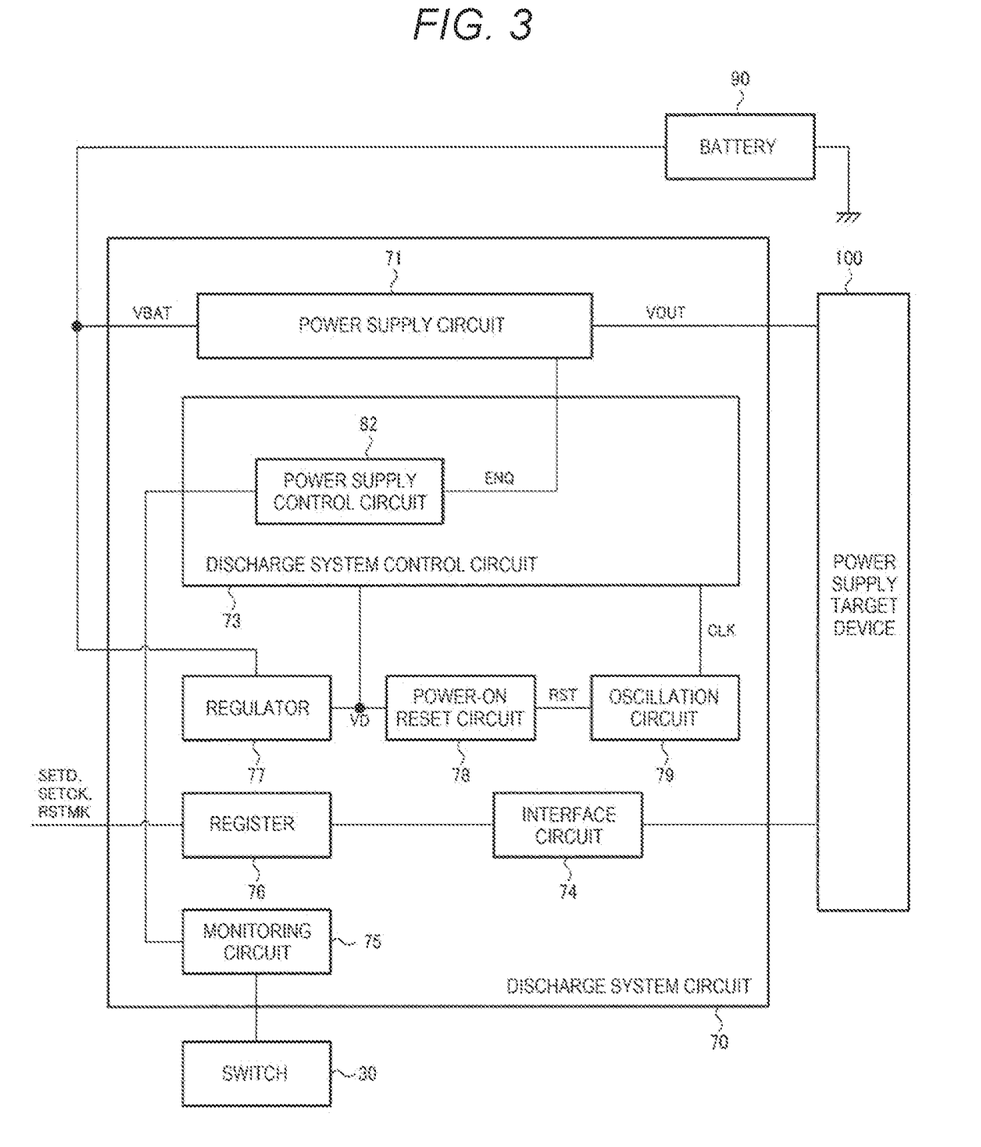
FIG. 3 is a configuration example of a discharge system circuit in a case in which an embodiment is not used.

FIG. 3 shows a configuration example of the discharge system circuit 70 when the present embodiment is not used. The discharge system circuit 70 includes a power supply circuit 71, a discharge system control circuit 73, a regulator 77, a power-on reset circuit 78, an oscillation circuit 79, a register 76, an interface circuit 74, and a monitoring circuit 75.

Figure 4:
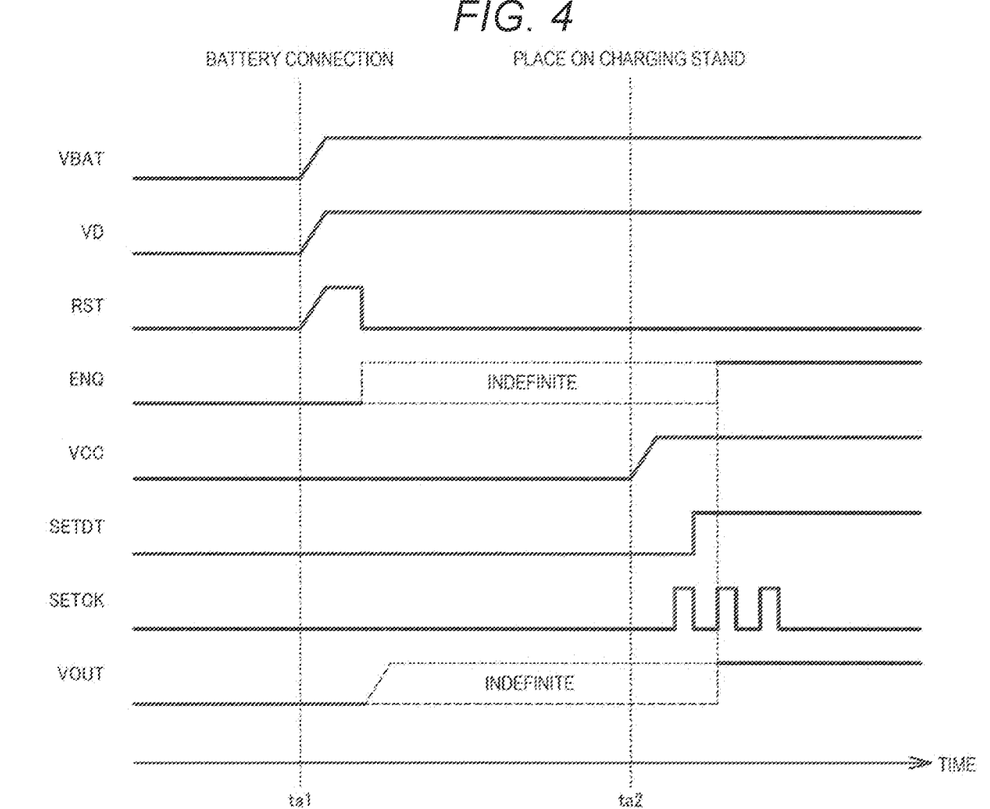
FIG. 4 is a waveform diagram showing an operation of the discharge system circuit when a battery is first coupled to a power supply circuit in the case in which the present embodiment is not used.

FIG. 4 is a waveform diagram showing an operation of the discharge system circuit 70 when the battery 90 is first coupled to the power supply circuit 50 including the discharge system circuit 70 in FIG. 3.

It is assumed that the battery 90 is coupled to the power supply circuit 50 in a state in which the electronic device 500 is not placed at the charger at a time ta1. At this time, the battery voltage VBAT is input to the power supply circuit 50. Since no power is supplied from the charger, the rectified voltage VCC is 0 V, and the charge system circuit 60 does not operate. Therefore, the signals SETDT and SETCK, which are shutdown release signals, are not output from the charge system circuit 60 to the discharge system circuit 70 and the register 76 is not initialized, and thus it is indefinite whether the regulator 77 is activated. Here, the regulator 77 is activated at the time ta1 when the battery voltage VBAT is supplied.

When the regulator 77 is activated and a regulated power supply voltage VD rises, the power-on reset circuit 78 lowers a power-on reset signal RST from a high level to a low level. When the power-on reset signal RST becomes low level, the discharge system circuit 70 is in a reset release state. At this time, the oscillation circuit 79 is activated to output a clock signal CLK, and the discharge system control circuit 73 starts the control processing based on the clock signal CLK. However, it is indefinite whether the power supply from the power supply circuit 71 to the power supply target device 100 is in an on state or an off state.

Specifically, the discharge system control circuit 73 includes a power supply control circuit 82, and the power supply control circuit 82 outputs an enable signal ENQ to the power supply circuit 71 to control the power supply circuit 71 to the on state or the off state. The power supply circuit 71 outputs the output voltage VOUT to the power supply target device 100 based on the battery voltage VBAT when the enable signal ENQ is at the high level, and does not supply power to the power supply target device 100 when the enable signal ENQ is at the low level. A state in which the power supply is in the on state is referred to as a power-on state, and a state in which the power supply is in the off state is referred to as a power-off state. The monitoring circuit 75 monitors an operation input to the switch 30 or a sensor output of a motion sensor (not shown). The power supply control circuit 82 outputs the enable signal ENQ based on the monitored result from the monitoring circuit 75. As described above, after the power-on reset signal RST becomes the low level, the discharge system circuit 70 is in the reset release state, and the discharge system control circuit 73 and the power supply circuit 71 are in an operable state. Therefore, the enable signal ENQ may be at the high level or the low level according to the monitored result from the monitoring circuit 75, and thus it is indefinite whether the power supply circuit 71 is in the power-on state or the power-off state.

It is assumed that the electronic device 500 is placed at a charging stand at a time ta2 after the time ta1. Power is supplied to the charging stand and the charging stand is in a state in which power can be transmitted to the electronic device 500. When the charge system circuit 60 receives power, the rectified voltage VCC rises, and the charge system circuit 60 starts to charge the battery 90. When the battery voltage VBAT is detected to be equal to or higher than a predetermined voltage, the charge system circuit 60 outputs the signals SETDT and SETCK, which are shutdown release signals, to the discharge system circuit 70. A register value of the register 76 is initialized by the shutdown release signals, and for example, a register value indicating the power-on state is written in the register 76. The power supply control circuit 82 outputs the high-level enable signal ENQ based on the register value. At this time, the indefiniteness of the enable signal ENQ is resolved, and the power supply circuit 71 is determined to be in the power-on state.

Since the enable signal ENQ is indefinite during a period of time from the time ta1 at which the battery is coupled for the first time to the time ta2 at which the electronic device 500 is placed at the charging stand, the battery 90 may be consumed in the power-on state. For example, at the time of manufacturing the electronic device 500, the power receiving device 40 and the battery 90 may be coupled to form a module, and the module may be stored until the module is assembled into a finished body. In such a case, it is assumed that the period from the time ta1 to the time ta2 becomes long, and the battery 90 is consumed in the power-on state. Since the electronic device 500 is not placed at the charging stand, the battery 90 may not be charged, and the battery 90 may continue being consumed for a long period of time.

Figure 5:
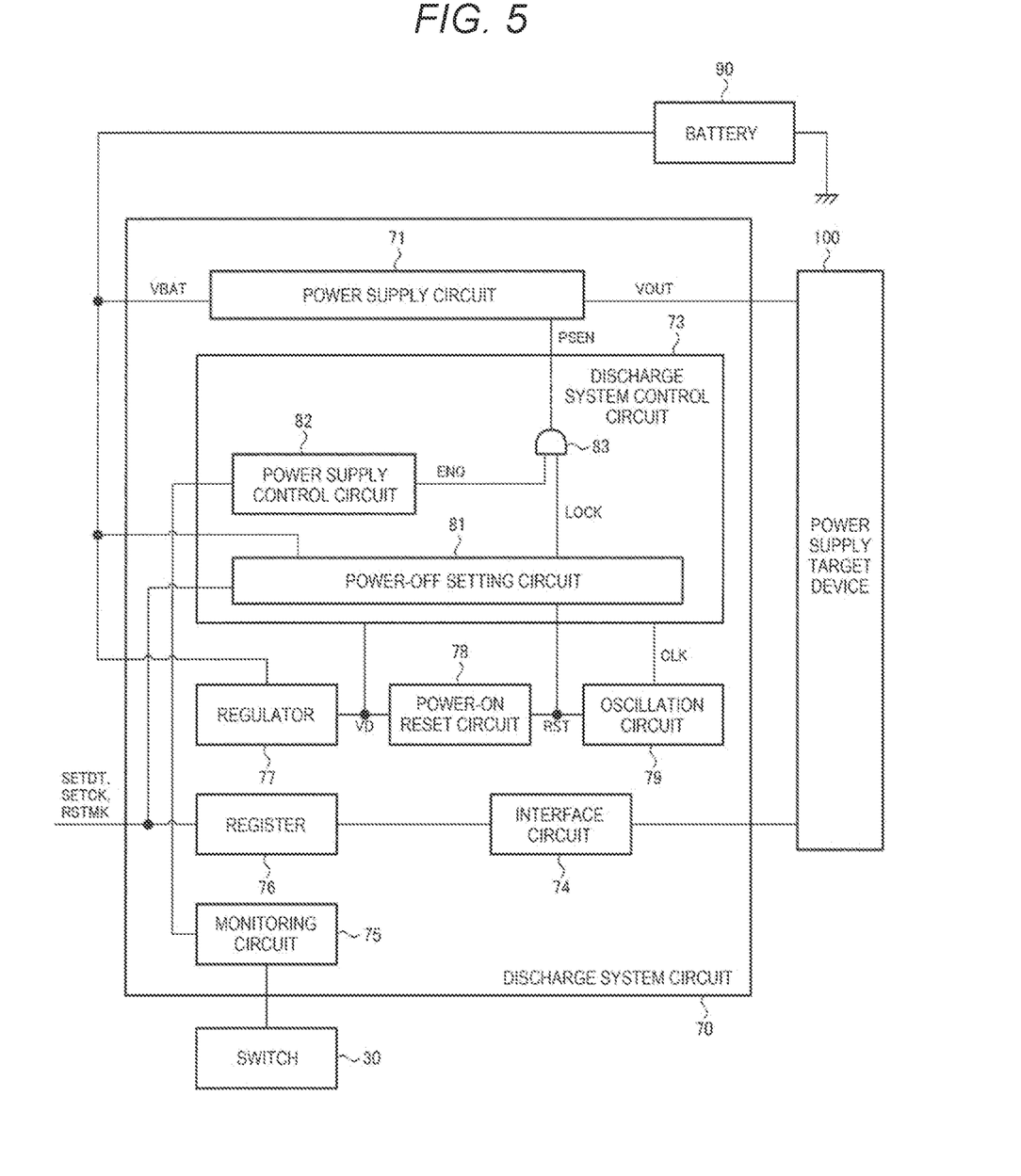
FIG. 5 is a detailed configuration example of a discharge system circuit according to the present embodiment.

FIG. 5 is a detailed configuration example of the discharge system circuit 70 according to the present embodiment. The discharge system circuit 70 includes the power supply circuit 71, the discharge system control circuit 73, the regulator 77, the power-on reset circuit 78, the oscillation circuit 79, the register 76, the interface circuit 74, and the monitoring circuit 75. Description of the same components as the components described with reference to FIG. 3 will be appropriately omitted.

The power supply circuit 71 is a regulator that regulates the battery voltage VBAT, and is, for example, a charge pump circuit. When the power supply circuit 71 is a charge pump circuit, the power-on state is a state in which the charge pump circuit performs a charge pump operation, and the power-off state is a state in which the charge pump operation of the charge pump circuit is stopped. The power supply circuit 71 may be a switching regulator using an inductor, a linear regulator using an amplifier circuit, or the like.

The interface circuit 74 transmits and receives information between the power supply target device 100 and the power supply circuit 50 in the power-on state in which power is supplied to the power supply target device 100. The transmitted and received information is, for example, data, a command, or the like, and is stored in the register 76.

The discharge system control circuit 73 executes various types of control processing executed during discharge of the battery 90. The discharge system control circuit 73 is, for example, the logic circuit generated according to the automatic arrangement and wiring method such as the gate array, or various processors such as the DSP. In the present embodiment, the discharge system control circuit 73 includes a power-off setting circuit 81, the power supply control circuit 82, and an enable signal output circuit 83.

As described with reference to FIG. 3, the power supply control circuit 82 outputs the enable signal ENQ based on the monitored result from the monitoring circuit 75. When the battery 90 is coupled to the power supply circuit 50, the power-off setting circuit 81 outputs a power-off control signal LOCK for determining the power-off state until the power supply circuit 50 receives power from the power transmission device 10. The enable signal output circuit 83 outputs a power supply enable signal PSEN to the power supply circuit 71 based on the enable signal ENQ and the power-off control signal LOCK. The enable signal output circuit 83 is, for example, an AND circuit. In this case, when a low level power-off control signal LOCK is input, the enable signal output circuit 83 outputs a low level power supply enable signal PSEN regardless of a logic level of the enable signal ENQ. That is, the low level power-off control signal LOCK indicates forced power-off, and thereby the power-off state is determined. When the high level power-off control signal LOCK is input, the enable signal output circuit 83 outputs the power supply enable signal PSEN having the same logic level as the enable signal ENQ. Accordingly, the power supply control by the power supply control circuit 82 becomes effective.

Figure 6:
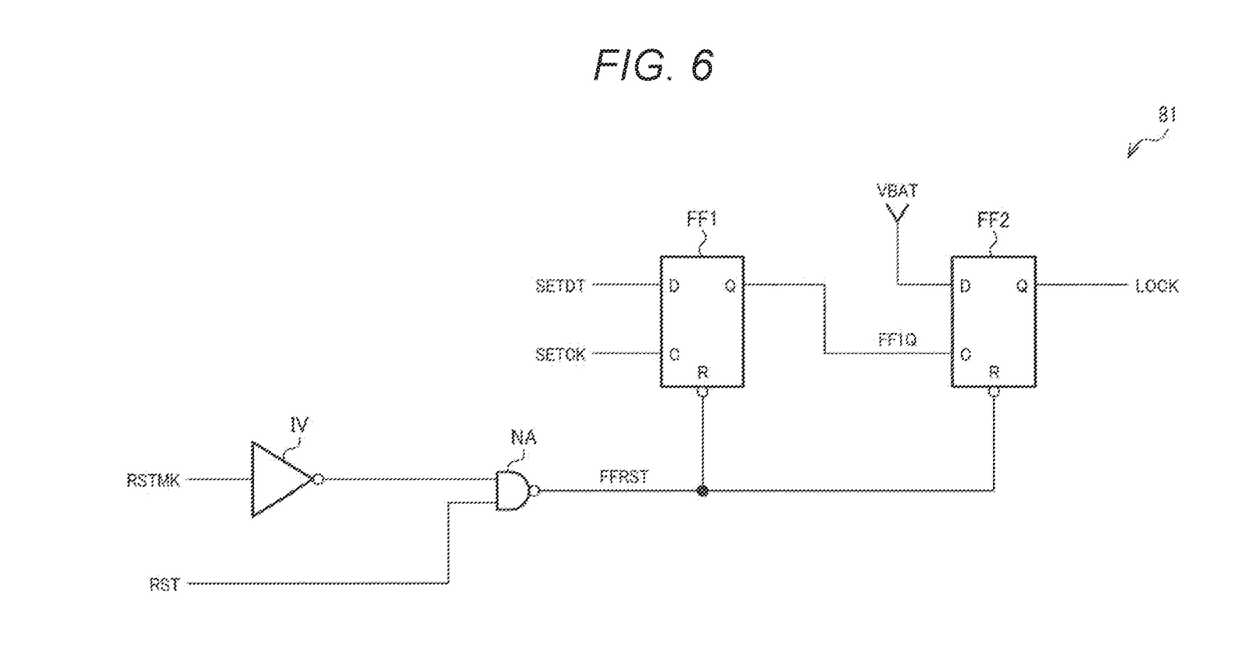
FIG. 6 is a detailed configuration example of a forced power-off circuit.

FIG. 6 is a detailed configuration example of the power-off setting circuit 81. The power-off setting circuit 81 includes an inverter IV, a NAND circuit NA, a first latch circuit FF1, and a second latch circuit FF2. The power supply voltage of these logic elements is the battery voltage VBAT. An operation of the power-off setting circuit 81 will be described with reference to the waveform diagram in FIG. 7.

Figure 7:
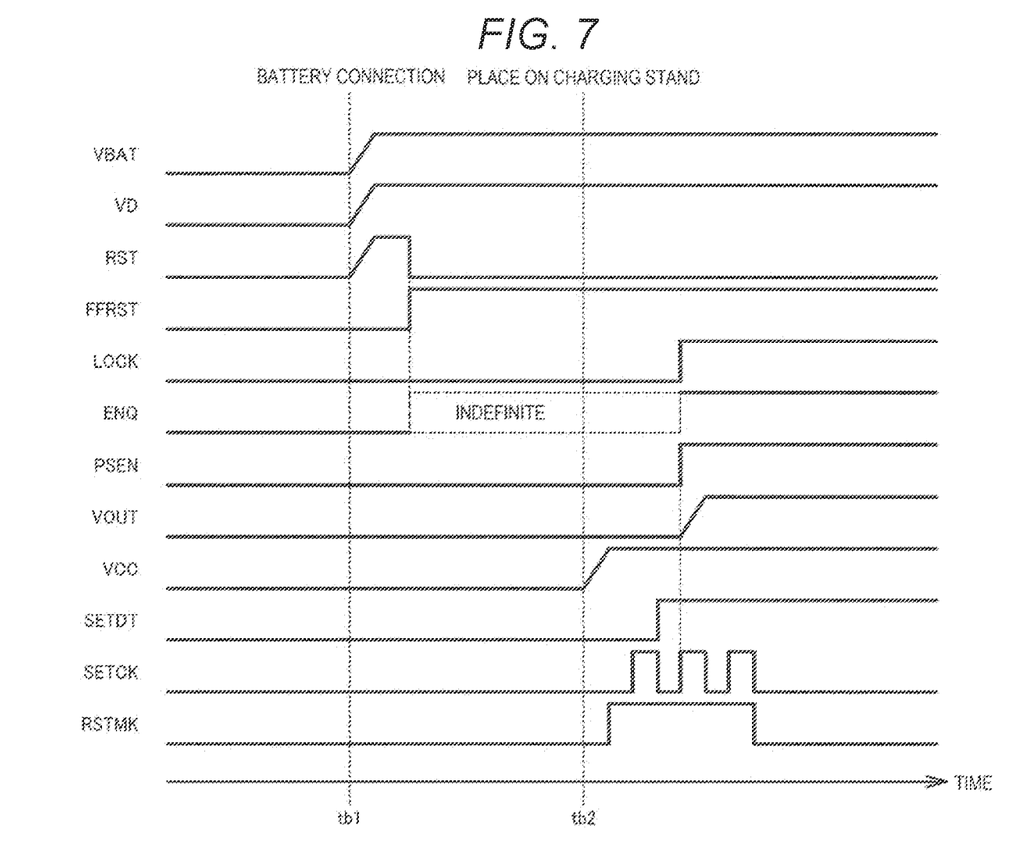
FIG. 7 is a waveform diagram showing an operation of the discharge system circuit when a battery is first coupled to a power supply circuit including the discharge system circuit according to the present embodiment.
Figure 8:
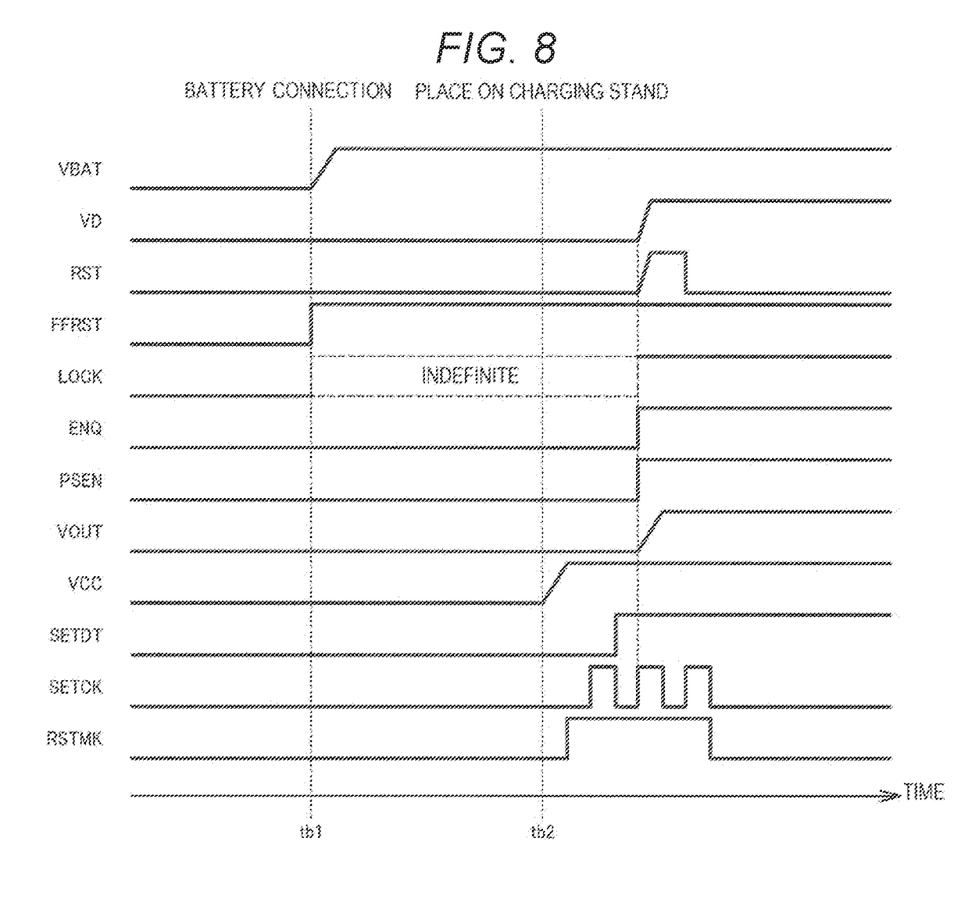
FIG. 8 is a waveform diagram showing an operation of the discharge system circuit when the battery is first coupled to the power supply circuit including the discharge system circuit according to the present embodiment.

FIGS. 7 and 8 are waveform diagrams showing an operation of the discharge system circuit 70 when the battery 90 is first coupled to the power supply circuit 50 including the discharge system circuit 70 according to the present embodiment. As described above, it is indefinite whether the regulator 77 is activated when the battery is coupled. FIG. 7 shows a waveform diagram in a case in which the regulator 77 is activated when the battery is connected.

As shown in FIG. 7, at a time tb1, the battery 90 is coupled to the power supply circuit 50 in a state in which the electronic device 500 is not placed at the charger. As in FIG. 4, after the power-on reset circuit 78 lowers the power-on reset signal RST from the high level to the low level and the discharge system circuit 70 enters the reset release state, the enable signal ENQ output from the power supply control circuit 82 becomes indefinite.

Since the power-off setting circuit 81 operates at the battery voltage VBAT, the power-off setting circuit 81 can operate after the battery voltage VBAT is supplied to the power supply circuit 50. Since the electronic device 500 is not placed at the charger, the charge system circuit 60 does not operate, and the mask signal RSTMK is at the low level. Therefore, when the power-on reset signal RST changes from the high level to the low level, the NAND circuit NA of the power-off setting circuit 81 changes the output signal FFRST from the low level to the high level. At this time, the first latch circuit FF1 and the second latch circuit are changed from a reset state to a reset release state, the first latch circuit FF1 outputs a low level power-off release trigger signal FF1Q, and the second latch circuit FF2 outputs the low level power-off control signal LOCK. Since the power-off control signal LOCK is at the low level, the power supply enable signal PSEN becomes at the low level, and the power supply circuit 71 is determined to be in the power-off state even if the enable signal ENQ is indefinite.

It is assumed that the electronic device 500 is placed at the charging stand at the time tb2 after the time tb1. It is assumed that power is supplied to the charging stand and the charging stand is in the state in which power can be transmitted to the electronic device 500. The charge system circuit 60 receives power, so that the rectified voltage VCC rises, and the charge system circuit 60 starts to charge the battery 90. When the battery voltage VBAT is detected to be equal to or higher than a predetermined voltage, the charge system circuit 60 outputs the signals SETDT and SETCK, which are shutdown release signals, and the mask signal RSTMK to the discharge system circuit 70.

The signal SETCK is a clock signal, and is three consecutive pulse signals. The signal SETDT changes from the low level to the high level at a falling edge of a first pulse signal of the signal SETCK. The mask signal RSTMK changes from the low level to the high level before a rising edge of the first pulse signal of the signal SETCK, and changes from the high level to the low level at a falling edge of a third pulse signal of the signal SETCK.

The first latch circuit FF1 takes in the signal SETDT at the falling edge of the signal SETCK. Therefore, the first latch circuit FF1 takes in a high level signal SETDT at a falling edge of a second pulse signal of the signal SETCK, and changes the power-off release trigger signal FF1Q from the low level to the high level. The second latch circuit FF2 takes in the battery voltage VBAT, that is, the high level, at a rising edge of the power-off release trigger signal FF1Q. Therefore, the second latch circuit FF2 changes the power-off control signal LOCK from the low level to the high level when the power-off release trigger signal FF1Q changes from the low level to the high level. When the power-off control signal LOCK becomes the high level, the power supply control based on the enable signal ENQ becomes effective, and the forced power-off based on the power-off control signal LOCK is released.

The register 76 is initialized when the shutdown release signals are input from the charge system circuit 60. At this time, for example, a register value for setting the enable signal ENQ to the high level is written in the register 76. In this case, the power supply enable signal PSEN is determined at the high level, and the power-on state is determined. Power is supplied based on the battery voltage VBAT, but since the electronic device 500 is placed at the charging stand, power is supplied to the electronic device 500 from the charging stand.

Even if the enable signal ENQ is indefinite during the period of time from the time tb1 at which the battery is coupled for the first time to the time tb2 at which the electronic device 500 is placed at the charging stand, the power-off state of the power supply circuit 71 is determined by the power-off control signal LOCK, and thus the battery 90 is not consumed.

FIG. 8 shows a waveform diagram when the regulator 77 is not activated when the battery is connected.

As shown in FIG. 8, since the regulated power supply voltage VD does not rise during the period of time from the time tb1 at which the battery is coupled for the first time to the time tb2 at which the electronic device 500 is placed at the charging stand, the power-on reset circuit 78 does not operate, and the power-on reset signal RST remains at the low level. Therefore, the first latch circuit FF1 and the second latch circuit FF2 are not reset, and the power-off control signal LOCK becomes indefinite.

However, since the regulated power supply voltage VD for operating the discharge system circuit 70 does not rise, the discharge system circuit 70 is not in the operable state, and the power supply circuit 71 is in the power-off state. Specifically, although the power supply circuit 71 is a charge pump circuit, since the regulated power supply voltage VD is not supplied to the discharge system control circuit 73, the discharge system control circuit 73 does not output a clock signal for operating the charge pump circuit. Since the enable signal ENQ output from the power supply control circuit 82 is at the low level, the power supply enable signal PSEN is at the low level. Since the power-off setting circuit 81 operates at the battery voltage VBAT, the NAND circuit NA outputs a high level output signal FFRST.

After the electronic device 500 is placed at the charging stand at the time tb2, the charge system circuit 60 outputs the signals SETDT and SETCK, which are shutdown release signals, and the mask signal RSTMK to the discharge system circuit 70. Since the output signal FFRST of the NAND circuit NA is at the high level, the first latch circuit FF1 and the second latch circuit FF2 are in the reset release state. Therefore, by the same operation as in FIG. 7, the power-off control signal LOCK changes from indefinite to the high level at the falling edge of the second pulse signal of the signal SETCK.

When the shutdown release signal is input to the discharge system circuit 70, the regulator 77 is activated and the regulated power supply voltage VD rises. At this time, the power-on reset circuit 78 changes the power-on reset signal RST from the high level to the low level. At this time, since the mask signal RSTMK is at the high level, the output signal FFRST of the NAND circuit NA is fixed at the high level regardless of the logic level of the power-on reset signal RST. If the output signal FFRST is set to the low level based on the power-on reset signal RST, the first latch circuit FF1 and the second latch circuit FF2 are reset and return to the forced power-off state. The power-on reset signal RST is masked by the mask signal RSTMK, so that the output signal FFRST is fixed to the high level, and the forced power-off release is maintained.

In the above present embodiment, the power supply circuit 50 includes the charge system circuit 60 and the discharge system circuit 70. The charge system circuit 60 charges the battery 90 based on power received by the power receiving unit 61. The discharge system circuit 70 supplies power to the power supply target device 100 based on the battery voltage VBAT from the battery 90. The discharge system circuit 70 includes the power supply circuit 71 and the power-off setting circuit 81. The power supply circuit 71 supplies power to the power supply target device 100 based on the battery voltage VBAT. The power-off setting circuit 81 sets the power supply circuit 71 to the power-off state when it is detected that a non-input state of the battery voltage VBAT to the discharge system circuit 70 is changed to an input state of the battery voltage VBAT to the discharge system circuit 70, and releases the power-off state after the power receiving unit 61 starts receiving power.

According to the present embodiment, after it is detected that the battery voltage VBAT is input to the discharge system circuit 70 by coupling the battery 90 to the power supply circuit 50, the power supply circuit 71 is determined to be in the power-off state until the power receiving unit 61 starts receiving power by placing the electronic device 500 at the charging stand. Accordingly, even if the period of time from the initial coupling of the battery to the charging of the battery 90 is long, the battery 90 is not consumed.

In FIG. 7, a time "when it is detected that a non-input state of the battery voltage VBAT to the discharge system circuit 70 is changed to an input state of the battery voltage VBAT to the discharge system circuit 70" corresponds to a time when the power-on reset circuit 78 detects the fall of the regulated power supply voltage VD and executes the power-on reset. At this time, the power-off setting circuit 81 outputs the low level power-off control signal LOCK to set the power supply circuit 71 to the power-off state. Then, after the time tb2 when the power receiving unit 61 starts receiving power, the power-off setting circuit 81 changes the power-off control signal LOCK from the low level to the high level. Accordingly, the power-off state based on the power-off control signal LOCK is released. When the enable signal ENQ indicates the power-on state, the power-off state of the power supply circuit 71 is released.

In the present embodiment, the charge system circuit outputs the power-off release signal to the power-off setting circuit 81 after the power receiving unit 61 starts receiving power. The power-off setting circuit 81 releases the power-off state based on the power-off release signal.

According to the present embodiment, since the charge system circuit 60 receives power from the power transmission device 10, the charge system circuit 60 can detect that the power receiving unit 61 starts receiving power. At this time, the charge system circuit 60 outputs the power-off release signal, so that the power-off setting circuit 81 can know that the power receiving unit 61 starts receiving power. Accordingly, the power-off setting circuit 81 can release the power-off state of the power supply circuit 71 when the power receiving unit 61 starts receiving power.

In FIGS. 2 to 8, the "power-off release signal" corresponds to the signals SETDT and SETCK, which are shutdown release signals. However, the "power-off release signal" is not limited to a signal for releasing the shutdown of the discharge system circuit 70, and may be at least a signal that serves as a trigger for releasing the power-off state based on the power-off control signal LOCK.

In the present embodiment, the discharge system circuit 70 includes the discharge system control circuit 73 that controls the power supply circuit 71, and the regulator 77 that supplies the regulated power supply voltage VD based on the battery voltage VBAT to the discharge system control circuit 73. The power-off setting circuit 81 sets the power supply circuit 71 to the power-off state when the regulated power supply voltage VD is turned on by supplying the battery voltage VBAT from the battery 90 to the regulator 77.

The battery voltage VBAT from the battery 90 is supplied to the regulator 77 by coupling the battery 90, and when the power supply voltage VD is turned on, the regulated power supply voltage VD is supplied to the discharge system control circuit 73. Accordingly, the discharge system control circuit 73 can control the power supply circuit 71, and the power supply circuit 71 may be in the power-on state. According to the present embodiment, since the power supply circuit 71 is set to the power-off state when the regulated power supply voltage VD is turned on, the power-off state of the power supply circuit 71 is determined when the battery 90 is coupled.

In the present embodiment, the discharge system circuit 70 includes the power-on reset circuit 78 that generates the power-on reset signal RST based on the regulated power supply voltage VD. The power-off setting circuit 81 sets the power supply circuit 71 to the power-off state when the power-on reset signal RST is in the reset state.

According to the present embodiment, when the regulated power supply voltage VD is turned on, the power-on reset circuit 78 generates the power-on reset signal RST, so that the power-off setting circuit 81 can know that the regulated power supply voltage VD is turned on. Accordingly, when the regulated power supply voltage VD is turned on, the power-off setting circuit 81 can set the power supply circuit 71 to the power-off state.

In FIG. 7, a time "when the power-on reset signal RST is in the reset state" corresponds to a time when the power-on reset signal RST is at the high level. When the power-on reset signal RST is at the high level, the output signal FFRST is at the low level. Therefore, the second latch circuit FF2 is in the reset state, the power-off control signal LOCK is at the low level, and the power supply circuit 71 is set to the power-off state.

In the present embodiment, the charge system circuit outputs the power-off release signal to the power-off setting circuit 81 after the power receiving unit 61 starts receiving power. The power-off setting circuit 81 releases the power-off state based on the power-off release signal, and masks the power-on reset signal RST during a period of time in which the power-off release signal is input.

As described with reference to FIG. 8, when the power-off state of the power supply circuit 71 is released based on the power-off release signal from the charge system circuit 60, the power-on reset may be executed. At this time, when the second latch circuit FF2 is reset based on the power-on reset signal RST, the power supply circuit 71 returns to the power-off state. According to the present embodiment, since the power-on reset signal RST is masked in the period of time in which the power-off release signal is input, even if the power-on reset is executed when the power-off release signal is input from the charge system circuit 60, the power supply circuit 71 does not return to the power-off state.

In FIGS. 7 and 8, the "period of time in which the power-off release signal is input" corresponds to a timing at which the logic level of the signal SETDT changes and a period of time including three pulse signals of the signal SETCK. More specifically, the period of time in which the mask signal RSTMK output by the charge system circuit 60 is at the high level corresponds to the period of time in which the power-off release signal is input. The inverter IV and the NAND circuit NA are mask circuits, and the mask circuits mask the power-on reset signal RST during the period of time in which the power-off release signal is input.

In the present embodiment, the power-off setting circuit 81 operates using the battery voltage VBAT as the power supply voltage.

In the present embodiment, the discharge system circuit 70 includes the regulator 77 that supplies the regulated power supply voltage VD based on the battery voltage VBAT to the power supply circuit 71, and the power-on reset circuit 78 that generates the power-on reset signal RST based on the regulated power supply voltage VD. The power-off setting circuit 81 includes the first latch circuit FF1 and the second latch circuit FF2. The second latch circuit FF2 outputs the power-off control signal LOCK indicating the power-off state when the power-on reset signal RST is in the reset state. The charge system circuit 60 outputs the power-off release signal to the power-off setting circuit 81 after the power receiving unit 61 starts receiving power. The first latch circuit FF1 outputs the power-off release trigger signal FF1Q based on the power-off release signal. The second latch circuit FF2 outputs the power-off control signal LOCK indicating the release of the power-off state when the power-off release trigger signal FF1Q is input.

According to the present embodiment, when the power-on reset signal RST enters the reset state, the second latch circuit FF2 outputs the power-off control signal LOCK indicating the power-off state. Accordingly, when the start of supply of the battery voltage VBAT is detected, the power supply circuit 71 can be set to the power-off state. According to the present embodiment, when the charge system circuit 60 outputs the power-off release signal, the second latch circuit FF2 outputs the power-off control signal LOCK indicating the release of the power-off state. Accordingly, the power-off state can be released after the power receiving unit 61 starts receiving power.

In the present embodiment, the electronic device 500 includes the power supply target device 100 and the power supply circuit 50. The power supply circuit 50 charges the battery 90 based on power received from the charger and supplies power based on the battery voltage VBAT from the battery 90 to the power supply target device 100. The power supply circuit 50 turns off power supply to the power supply target device 100 when the battery 90 is coupled to the power supply circuit 50, and turns on power supply to the power supply target device 100 when the electronic device 500 is placed at the charger in a power transmittable state.

According to the present embodiment, after the battery 90 is coupled to the power supply circuit 50, the supply of power to the power supply target device 100 is determined to be off until the electronic device 500 is placed at the charging stand. Accordingly, even if the period of time from the initial coupling of the battery to the charging of the battery 90 is long, the battery 90 is not consumed.

3. Operation when Battery is in Shutdown State

Next, a case in which the battery 90 is in the shutdown state when the battery 90 is coupled for the first time will be described. First, a problem that occurs when the present embodiment is not used will be described with reference to FIG. 9.

Figure 9:
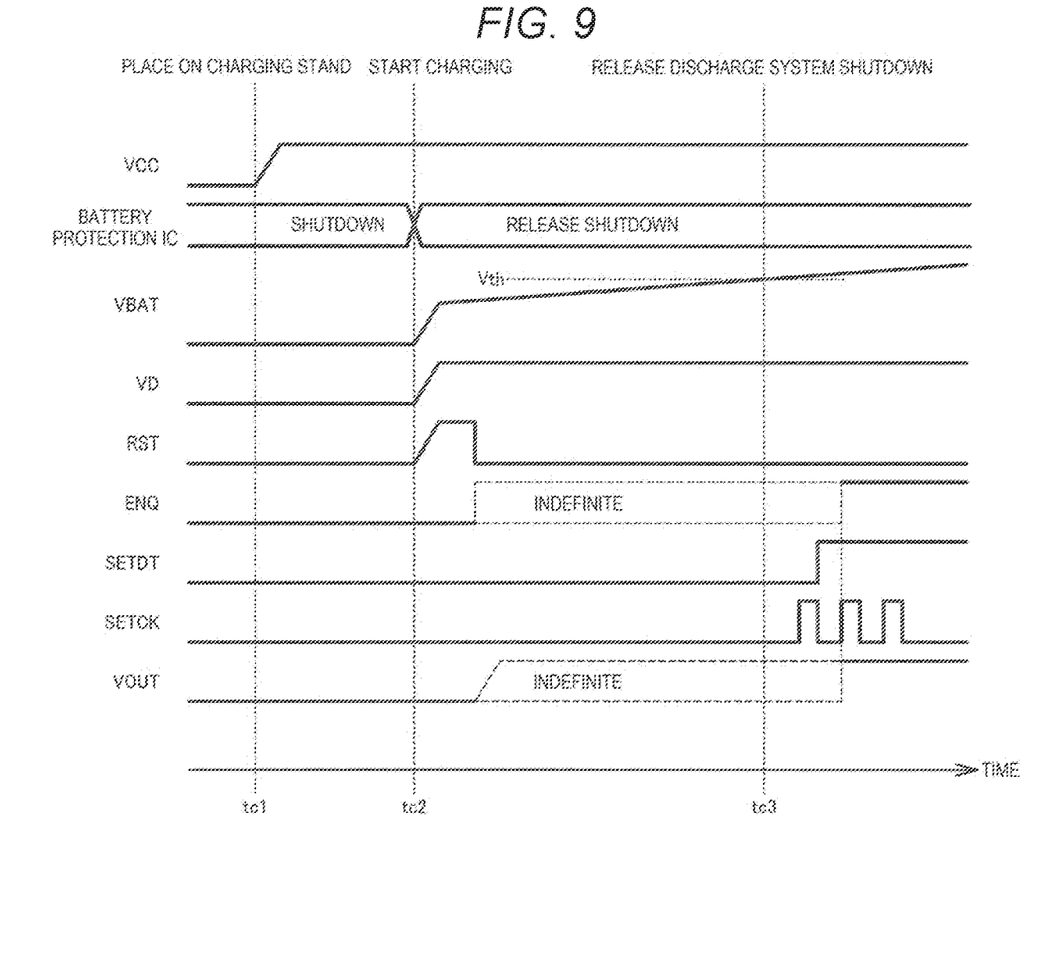
FIG. 9 is a waveform diagram showing an operation of the discharge system circuit when the battery is in a shutdown state when the battery is coupled for the first time in the case in which the present embodiment is not used.

As shown in FIG. 9, at a time tc1, the electronic device 500 is placed at the charger in a state in which the battery 90 is coupled to the power supply circuit 50. The battery 90 includes a built-in battery protection IC, and when over-discharge of the battery 90 is detected, the battery 90 is shut down and the battery voltage VBAT is not output. In this state, even if the battery 90 is coupled to the power supply circuit 50, when viewed from the power supply circuit 50, the state is the same as that in which the battery 90 is not coupled to the power supply circuit 50.

When the electronic device 500 is placed at the charger at the time tc1, the rectified voltage VCC rises, and the charge system circuit 60 starts charging the battery 90. This time is set as tc2. When the battery protection IC of the battery 90 detects the start of charging, the battery protection IC releases the shutdown state of the battery 90 and causes the battery 90 to output the battery voltage VBAT. At this time, when viewed from the power supply circuit 50, the state is the same as that in which the battery 90 not in the shutdown state is first coupled. After the time tc2 at which the shutdown state of the battery 90 is released, the enable signal ENQ becomes indefinite as in FIG. 4. When the power-off setting circuit 81 according to the present embodiment is not used, it is indefinite whether the power supply circuit 71 is in the power-on state or the power-off state based on the indefinite enable signal ENQ, and the battery 90 is consumed when the power supply circuit 71 is in the power-on state.

The charge system circuit 60 outputs the shutdown release signals to the discharge system circuit 70 when detecting that the battery voltage VBAT exceeds a threshold voltage Vth. Accordingly, the indefinite state of the power supply circuit 71 is released. Since the battery 90 is in an over-discharge state, it is assumed that a time until the battery voltage VBAT exceeds the threshold voltage Vth becomes long. At this time, when the power supply circuit 71 is in the power-on state and the battery 90 is consumed, the charging time becomes longer.

Figure 10:
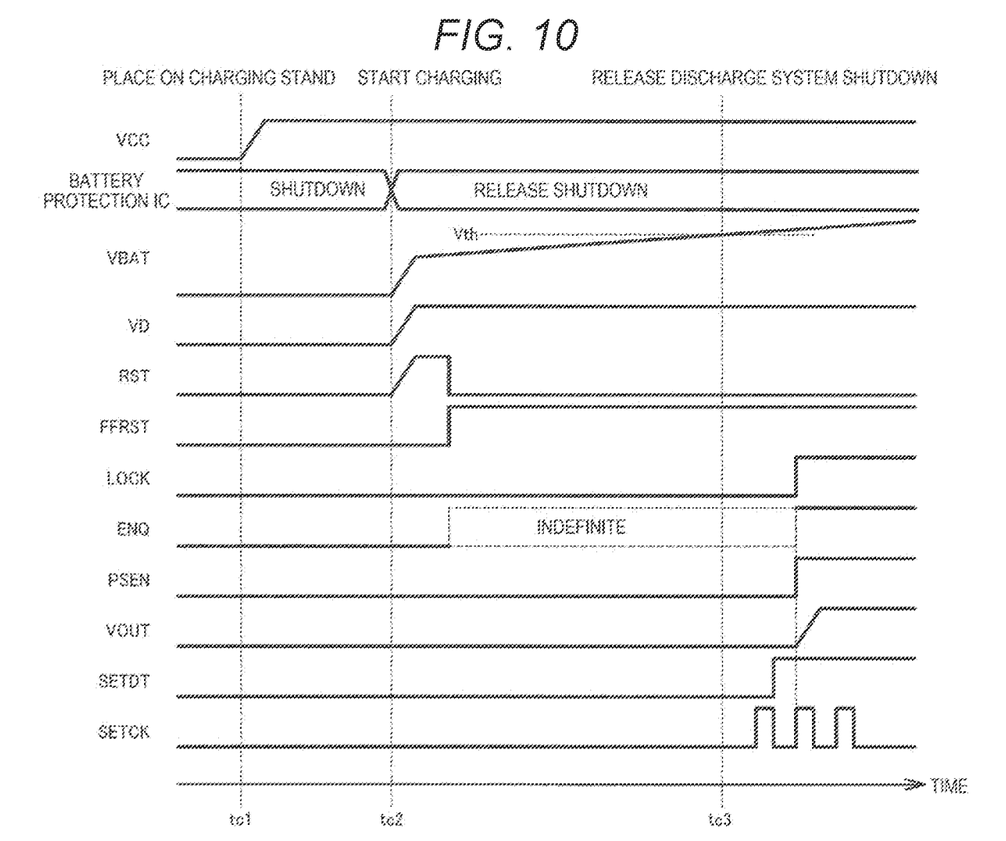
FIG. 10 is a waveform diagram showing an operation of the discharge system circuit when the battery is in a shutdown state when the battery is coupled for the first time according to the present embodiment.

FIG. 10 shows a waveform diagram of the discharge system circuit 70 according to the present embodiment. As in FIG. 7, the power-off setting circuit 81 fixes the power-off control signal LOCK to the low level until the signals SETDT and SETCK, which are shutdown release signals, are received from the charge system circuit 60 to the discharge system circuit 70. Accordingly, the power supply circuit 71 is maintained in the power-off state, and the battery 90 is not consumed until the battery 90 is charged and the shutdown of the discharge system circuit 70 is released.

A power supply circuit according to the present embodiment described above includes a charge system circuit and a discharge system circuit. The charge system circuit charges a battery based on power received by a power receiving unit. The discharge system circuit supplies power to a power supply target device based on a battery voltage from the battery. The discharge system circuit includes a power supply circuit and a power-off setting circuit. The power supply circuit supplies power to the power supply target device based on the battery voltage. The power-off setting circuit sets the power supply circuit to the power-off state when it is detected that a non-input state of the battery voltage to the discharge system circuit is changed to an input state of the battery voltage to the discharge system circuit, and releases the power-off state after the power receiving unit starts receiving power.

According to the present embodiment, after the start of the supply of the battery voltage is detected by coupling the battery to the power supply circuit, the power supply circuit is determined to be in the power-off state until the power receiving unit starts receiving power by placing the electronic device at the charging stand. Accordingly, the battery is not consumed during the period of time from the initial coupling of battery to the charging of the battery.

In the present embodiment, the charge system circuit outputs the power-off release signal to the power-off setting circuit after the power receiving unit starts receiving power. The power-off setting circuit may release the power-off state based on the power-off release signal.

According to the present embodiment, since the charge system circuit receives power from the power transmission device, the charge system circuit can detect that the power receiving unit starts receiving power. At this time, the charge system circuit outputs the power-off release signal, so that the power-off setting circuit can know that the power receiving unit starts receiving power. Accordingly, the power-off setting circuit can release the power-off state of the power supply circuit when the power receiving unit starts receiving power.

In the present embodiment, the discharge system circuit may include a discharge system control circuit and a regulator. The discharge system control circuit may control the power supply circuit. The regulator may supply a regulated power supply voltage based on the battery voltage to the discharge system control circuit. The power-off setting circuit may set the power supply circuit to the power-off state when the regulated power supply voltage is turned on by supplying the battery voltage from the battery to the regulator.

When the battery voltage from the battery is supplied to the regulator by coupling the battery and the regulated power supply voltage is turned on, the regulated power supply voltage is supplied to the discharge system control circuit. Accordingly, the discharge system control circuit can control the power supply circuit, and the power supply circuit may be in the power-on state. According to the present embodiment, since the power supply circuit is set to the power-off state when the regulated power supply voltage is turned on, the power-off state of the power supply circuit is determined when the battery is coupled.

In the present embodiment, the discharge system circuit may include a power-on reset circuit. The power-on reset circuit may generate a power-on reset signal based on the regulated power supply voltage. The power-off setting circuit may set the power supply circuit to the power-off state when the power-on reset signal is in the reset state.

According to the present embodiment, when the power supply voltage is turned on, the power-on reset circuit generates the power-on reset signal, so that the power-off setting circuit can know that the regulated power supply voltage is turned on. Accordingly, when the regulated power supply voltage is turned on, the power-off setting circuit can set the power supply circuit to the power-off state.

In the present embodiment, the charge system circuit outputs the power-off release signal to the power-off setting circuit after the power receiving unit starts receiving power. The power-off setting circuit releases the power-off state based on the power-off release signal, and masks the power-on reset signal during a period of time in which the power-off release signal is input.

When the power-off state of the power supply circuit is released based on the power-off release signal from the charge system circuit, if the second latch circuit is reset based on the power-on reset signal, the power supply circuit returns to the power-off state. According to the present embodiment, since the power-on reset signal is masked during the period of time in which the power-off release signal is input, even if the power-on reset is executed when the power-off release signal is received from the charge system circuit, the power supply circuit does not return to the power-off state.

In the present embodiment, the power-off setting circuit may operate using the battery voltage as the power supply voltage.

In the present embodiment, the discharge system circuit may include the regulator and the power-on reset circuit. The regulator may supply the regulated power supply voltage based on the battery voltage to the power supply circuit. The power-on reset circuit may generate the power-on reset signal based on the regulated power supply voltage. The power-off setting circuit may include a first latch circuit and a second latch circuit. The second latch circuit may output a power-off control signal indicating the power-off state when the power-on reset signal is in the reset state. The charge system circuit may output the power-off release signal to the power-off setting circuit after the power receiving unit starts receiving power. The first latch circuit may output a power-off release trigger signal based on the power-off release signal. The second latch circuit may output the power-off control signal indicating the release of the power-off state when the power-off release trigger signal is input.

According to the present embodiment, when the power-on reset signal enters the reset state, the second latch circuit outputs the power-off control signal indicating the power-off state. Accordingly, when the start of supply of the battery voltage is detected, the power supply circuit can be set to the power-off state. According to the present embodiment, when the charge system circuit outputs the power-off release signal, the second latch circuit outputs the power-off control signal indicating the release of the power-off state. Accordingly, the power-off state can be released after the power receiving unit starts receiving power.

An electronic device according to the present embodiment includes a power supply target device and a power supply circuit. The power supply circuit charges the battery based on power received from the charger and supplies power based on the battery voltage from the battery to the power supply target device. The power supply circuit turns off the supply of the power when the battery is coupled to the power supply circuit, and turns on the supply of the power when the electronic device is placed at the charger in the power transmittable state.

According to the present embodiment, after the battery is connected to the power supply circuit, the supply of power to the power supply target device is determined to be off until the electronic device is placed at the charging stand. Accordingly, the battery is not consumed during the period of time from the initial coupling of battery to the charging of the battery.

Although the present embodiment has been described in detail above, it will be easily understood by those skilled in the art that many modifications can be made without substantially departing from the novel matters and effects according to the present disclosure. Therefore, all such modifications are intended to be included within the scope of the present disclosure. For example, a term cited with a different term having a broader meaning or the same meaning at least once in the description or in the drawings can be replaced with the different term in any place in the description or in the drawings. All combinations of the present embodiment and the modifications are also included in the scope of the present disclosure. The configurations, operations, and the like of the power transmission device, the electronic device, the power receiving device, the power supply circuit, the power supply target device, the battery, the power transmission system, and the like are not limited to those described in the present embodiment, and various modifications can be made.

What is claimed is:

1. A power supply circuit comprising:
   a charge system circuit that charges a battery based on power received by a power receiving unit from an external power transmission device; and
   a discharge system circuit that supplies power to a power supply target device based on a battery voltage from the battery, wherein
   the discharge system circuit includes:
      a power feeder circuit configured to perform a power supply operation to feed the power to the power supply target device based on the battery voltage, and the power supply operation includes a power-on state, in which the power supply operation is performed, and a power-off state, in which the power supply operation is stopped;
      a discharge system control circuit configured to control the power feeder circuit;
      a regulator configured to supply a regulated power supply voltage based on the battery voltage to the discharge system control circuit; and
      a power-off setting circuit configured to:
         set the power feeder circuit to the power-off state when the regulated power supply voltage is turned on by supplying the battery voltage from the battery to the regulator; and
         release the power-off state after the power receiving unit starts receiving the power from the external power transmission device.

2. The power supply circuit according to claim 1, wherein the charge system circuit outputs a power-off release signal to the power-off setting circuit after the power receiving unit starts receiving the power, and the power-off setting circuit releases the power-off state based on the power-off release signal.

3. The power supply circuit according to claim 1, wherein the discharge system circuit includes a power-on reset circuit that generates a power-on reset signal based on the regulated power supply voltage, and the power-off setting circuit sets the power feeder circuit to the power-off state when the power-on reset signal is in a reset state.

4. The power supply circuit according to claim 3, wherein the charge system circuit outputs a power-off release signal to the power-off setting circuit after the power receiving unit starts receiving the power, and the power-off setting circuit releases the power-off state based on the power-off release signal, and masks the power-on reset signal during a period of time in which the power-off release signal is input.

5. The power supply circuit according to claim 1, wherein the power-off setting circuit operates using the battery voltage as a power supply voltage.

6. The power supply circuit according to claim 1, wherein the discharge system circuit includes:
   the regulator configured to supply the regulated power supply voltage based on the battery voltage to the power feeder circuit; and
   a power-on reset circuit configured to generate a power-on reset signal based on the regulated power supply voltage,
   the power-off setting circuit includes a first latch circuit and a second latch circuit,
   the second latch circuit outputs a power-off control signal indicating the power-off state when the power-on reset signal is in a reset state,
   the charge system circuit outputs a power-off release signal to the power-off setting circuit after the power receiving unit starts receiving the power,
   the first latch circuit outputs a power-off release trigger signal based on the power-off release signal, and
   the second latch circuit outputs the power-off control signal indicating release of the power-off state when the power-off release trigger signal is input.

7. An electronic device comprising:
   a power supply target device; and
   a power supply circuit configured to charge a battery based on power received from a charger and that supplies power based on a battery voltage from the battery to the power supply target device, the power supply circuit including:

a charge system circuit that charges the battery based on the power received by a power receiving unit from the charger; and a discharge system circuit that supplies the power to the power supply target device based on the battery voltage from the battery, wherein the discharge system circuit includes:

a power feeder circuit configured to perform a power supply operation to supply the power to the power supply target device based on the battery voltage, and the power supply operation includes a power-on state, in which the power supply operation is performed, and a power-off state, in which the power supply operation is stopped;

a discharge system control circuit configured to control the power feeder circuit;

a regulator configured to supply a regulated power supply voltage based on the battery voltage to the discharge system control circuit; and a power-off setting circuit configured to:

set the power feeder circuit to the power-off state when the regulated power supply voltage is turned on by supplying the battery voltage from the battery to the regulator; and release the power-off state after the power receiving unit starts receiving power from the charger, and the power supply circuit turns off the supply of the power when the battery is coupled to the power supply circuit, and turns on the supply of the power when the electronic device is placed at the charger in a power transmittable state.

8. The electronic device according to claim 7, wherein the charge system circuit outputs a power-off release signal to the power-off setting circuit after the power receiving unit starts receiving the power, and the power-off setting circuit releases the power-off state based on the power-off release signal.

9. The electronic device according to claim 7, wherein the discharge system circuit includes a power-on reset circuit that generates a power-on reset signal based on the regulated power supply voltage, and the power-off setting circuit sets the power feeder circuit to the power-off state when the power-on reset signal is in a reset state.

10. The electronic device according to claim 9, wherein the charge system circuit outputs a power-off release signal to the power-off setting circuit after the power receiving unit starts receiving the power, and the power-off setting circuit releases the power-off state based on the power-off release signal, and masks the power-on reset signal during a period of time in which the power-off release signal is input.

11. The electronic device according to claim 7, wherein the power-off setting circuit operates using the battery voltage as a power supply voltage.

12. The electronic device according to claim 7, wherein the discharge system circuit includes:

the regulator configured to supply the regulated power supply voltage based on the battery voltage to the power feeder circuit; and a power-on reset circuit configured to generate a power-on reset signal based on the regulated power supply voltage, the power-off setting circuit includes a first latch circuit and a second latch circuit, the second latch circuit outputs a power-off control signal indicating the power-off state when the power-on reset signal is in a reset state, the charge system circuit outputs a power-off release signal to the power-off setting circuit after the power receiving unit starts receiving the power, the first latch circuit outputs a power-off release trigger signal based on the power-off release signal, and the second latch circuit outputs the power-off control signal indicating release of the power-off state when the power-off release trigger signal is input.

* * * * *